United States Patent Office 3,505,128
Patented Apr. 7, 1970

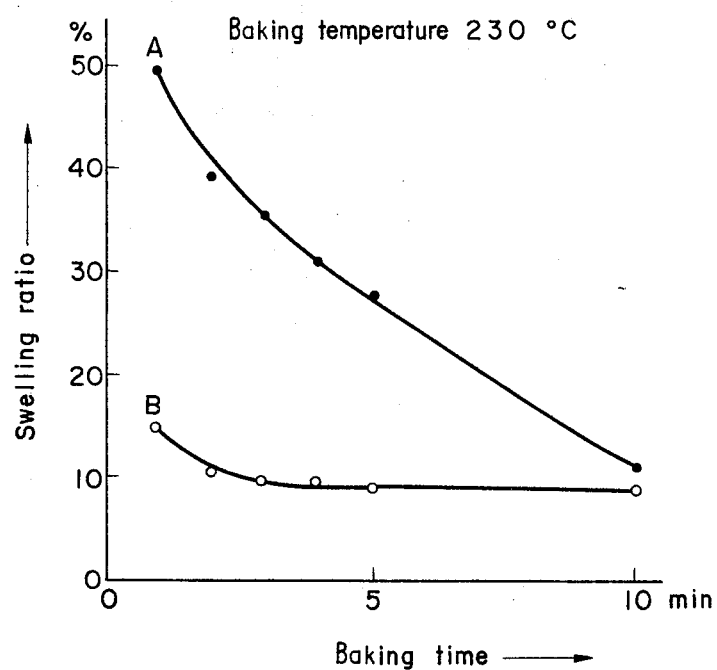

3,505,128
AQUEOUS METAL-COATING COMPOSITION
Masahiro Fujii, Tokyo, Naoe Hirai, Kawasaki, and Katsuya Inouye, Tokyo, Japan, assignors to Yawata Iron & Steel Co., Ltd., Tokyo, Japan
Filed Oct. 4, 1965, Ser. No. 492,650
Claims priority, application Japan, Oct. 7, 1964, 39/57,167
Int. Cl. B44d 1/34; C09d 3/48
U.S. Cl. 148—6.2        24 Claims

ABSTRACT OF THE DISCLOSURE

A single-liquid type aqueous metal-coating paint composition having corrosion-resistance and workability far superior to any conventional paint of the same kind is formed by baking in a short time at high temperature. The composition is mainly composed of a polymer or a polymer-cross-linking agent mixture containing a combination of functional groups (A) and (B) capable of liberating low molecular reducing materials by a condensation reaction in combination with water-soluble chromium compounds, wherein said functional group (A) is at least one selected from carboxyl, hydroxyl and methylol groups and the functional group (B) is an alkoxymethyl group.

---

This invention relates to an aqueous coating composition suitable for coating metal surfaces.

An object of this invention is to provide an excellent single-liquid type aqueous metal-coating composition having specific film-forming mechanism, which is an aqueous solution or a water-dispersed emulsion of polymers and/or a polymer-cross linking agent mixture containing the combination of functional groups capable of liberating low molecular weight reducing materials and forming the intermolecular cross linkages of the polymers by a condensation reaction, and being added in an alkaline state with one or more hexa-valent chromium compounds, such as chromic anhydride, water-soluble chromates or water-soluble bichromates.

Another object of this invention is to extremely improve the properties of coating as the result of the formation of the intermolecular cross linkages of polymers and tri-valent chromium compound by the reduction of a part or whole of the above-mentioned hexa-valent chromium compound in the coating. When the said aqueous metal-coating composition is applied on a metal plate and the like followed by baking it, the above mentioned hexa-valent chromium compound accelerates the intermolecular cross linkage of polymers and the same time is reduced to a tri-valent chromium compound by the reducing materials by-produced in the said cross linkage reaction.

Further object of this invention is to produce economically coated metal plates having excellent properties by means of a high-speed continuous coating machine by using the aqueous metal-coating composition of the present invention.

The aqueous metal-coating composition of this invention enables the use of a high-speed continuous coating process since it can reduce the baking period for it. The various properties of the thus cured coating of the present coating composition, such as corrosion resistance, workability, adhesive property, impact resistance, alkali resistance, acid resistance, chemical resistance, weathering durability, heat resistance, water resistance, humidity resistance, solvent resistance, abrasion durability, coating hardness, gloss, and the like are very excellent as compared with those of conventional metal-coating compositions.

In addition, the term "hexa-valent chromium compound" used in the specification and the claims of this invention means a compound having a hexa-valent chromium atom in the molecule, such as chromic anhydride, a water-soluble chromate, or a water-soluble bichromate. Further, the term "tri-valent chromium compound" means the products formed by the reduction of said hexa-valent chromium compound.

As well known, organic solvent-type coating compositions are excellent in quick drying property of coating and water resistance, adhesive property, chemical resistance, corrosion resistance, gloss and the like of cured coating as compared with conventional aqueous coating compositions but the use of the former is accompanied with the dangers of a fire, health hazards, etc., by the solvent vapor, which needs the use of additional equipment for exhausting and recovering the solvent and for preventing disasters. On the other hand, aqueous coating compositions have such merits that they are safe in fire and hygiene as well as that coating equipments or devices can be easily cleaned after use, but there is a drawback that they need in general a long period of time in baking. Moreover, the use of the aqueous coating compositions is accompanied by the reduction of the properties of cured coating, such as the reduction in corrosion resistance, water resistance, humidity resistance, alkali resistance, chemical resistance, and gloss of cured coating.

There is a tendency of adopting aqueous coating compositions having no danger of fire in continuous coating process as in a motor-manufacturing factory, even though there is a disadvantage of requiring a long period of time in baking, since a large quantity of coating compositions is used in such a process and hence the use of organic solvent type coating compositions is very dangerous.

Since conventional aqueous metal-coating compositions have many drawbacks as mentioned above, various methods have been proposed for overcoming such troubles. Among them, the most usual method is one in which various properties are improved by adding an organic cross-linking agent, etc., in the coating composition whereby cross-linking structures are formed in coating after baking. Several methods of such type have been known. For example, there have been known a method wherein a diepoxidized compound or a water-soluble alkoxymethylamine is incorporated as a cross-linking agent in an aqueous solution or a water-dispersed emulsion of acrylic copolymer containing acrylic acid or methacrylic acid and a method wherein a water-soluble alkoxymethylamine is added in a water-soluble alkyd resin. There has also been known as one of the methods that by providing in a molecule two functional groups reacting with each other, such as a carboxyl group and a glycidyl group, a cross-linking structure is formed by the reaction of both functional groups.

By such methods, the properties of cured coatings may be improved in some extent but they are not sufficient, and in particular they are still extremely inferior to those of organic-solvent type metal-coating composition in water resistance, humidity resistance, alkali resistance, corrosion resistance, chemical resistance, workability, weathering durability, and the like. Moreover, since there is a fatal fault in the use of aqueous metal-coating composition accompanied by the cross-linking reaction that the rate of cross-linking reaction is very low, it takes a long period of time for baking.

As a catalyst for accelerating such a cross-linking reaction, there has hitherto been used a compound liberating protons, such as phosphoric acid, p-toluene sulfonic acid, etc. However, the cross-linking reaction may be accelerated to some extent by the addition of such a catalyst but it is not sufficient, that is, even if such a catalyst is added, it requires 30–60 minutes or more for accomplishing baking at a temperature of 100–200° C. Therefore, it has been impossible to carry out continuous high-speed coating for various metal plates using such a conventional aqueous metal-coating composition.

Further, as another method for improving the corrosion resistance of coating by an aqueous metal-coating composition, a method has been provided in which a chromium compound is added in the composition. Since hexa-valent chromium compounds, such as chromic anhydride, water-soluble chromate, water-soluble bichromate, etc., have an electro-chemical corrosion resisting power and tri-valent chromium compounds formed by the reduction of the above-mentioned hexa-valent chromium compounds are not corroded by water, alkalis, and acids, the properties of coating, such as corrosion resistance and chemical resistance can be improved by adding the hexa-valent chromium compound alone or together with the tri-valent chromium compound in the metal-coating composition.

As a method for improving corrosion resistance of coating by using the hexa-valent chromium compound, there have been known generally the following methods.

First of all, there is a method wherein a hexa-valent chromium compound is added, in an acid state, in an aqueous solution or a water-dispersed emulsion of a polymer. That is, in the process, the hexa-valent chromium compound is added together with phosphoric acid in an acid state of 3–5 in pH in a water-dispersed emulsion of an alkyd resin or an acrylic copolymer. Further, there is a method wherein a hexa-valent chromium compound is added in an aqueous solution of a polymer, such as polyacrylic acid, polyvinyl alcohol, and the like having a pH of 2–5. However, by the above-mentioned methods, thick coating cannot be applied in the case of coating upon the surfaces of steel plates and hence such processes can be applied in the case of using only primers.

Furthermore, as a method for adding a hexa-valent chromium compound in an alkaline state, there is a method wherein a hexa-valent chromium compound, such as chromic anhydride, or ammonium chromate is added in an alkaline aqueous solution or an alkaline water-dispersed emulsion of a polymer having carboxyl groups, whereby cross-linking is formed between the carboxyl group and the hexa-valent chromium compound at the formation of coating by baking to improve the properties of coating by the actions of cross-linking structure and corrosion-preventing power of the hexa-valent chromium compound. This method is mainly used for top-coating and primers.

Then, as a method wherein a hexa-valent chromium compound and a tri-valent chromium compound are provided together in coating, there has been known the following method. That is, a water-soluble hexa-valent chromium compound and water-soluble tri-valent chromium compound are added in acid states in an aqueous solution or a water-dispersed emulsion containing a polymer such as a partially saponified polyvinyl acetate together with a triazine derivative, and thus prepared composition is applied on metal plates. However, since the coating composition prepared by the method cannot be applied in a thick coating it is also used for only primers.

Further, there have been known the following two methods as one wherein a tri-valent chromium compound is incorporated in a coating composition together with a hexa-valent chromium compound by partially reducing the hexa-valent chromium compound.

That is, in the one of the methods, the hexa-valent chromium compound is reduced before the composition is applied on metal surfaces. Thus, a hexa-valent chromium compound such as chromic anhydride is added in an aqueous solution of a copolymer, such as polyacrylic acid or polyvinyl alcohol and then an aldehyde compound such as formaline is added as a reducing agent in the composition to reduce a part of the hexa-valent chromium compound into a tri-valent chromium compound. Thus prepared coating composition is then applied on metal surfaces to form cured coating containing the hexa-valent chromium compound and the tri-valent chromium compound therein. The coating composition prepared by the method is also used as a primer.

The other of the methods is one wherein the reduction of the hexa-valent chromium compound is conducted at baking after coating metal surfaces. That is, a hexa-valent chromium compound, such as chromic anhydride is incorporated in a water-dispersed emulsion of a styrene-butadiene copolymer and then a sugar such as sucrose is added as a reducing agent in the coating composition. The coating composition is applied on metal surfaces and a part of the hexa-valent chromium composition is reduced at the formation of coating by baking whereby coating is formed containing the hexa-valent chromium compound and the tri-valent chromium compound.

However, in these conventional methods for improving the properties of metal-coating aqueous compositions by using the chromium compounds, there are many faults. The reasons are as follows. As well known in general, since a hexa-valent chromium compound is a strong oxidizing agent and has a strong oxidizing power in acid state, if an organic material which will be easily oxidized is present together with the chromium compound in the coating composition, the organic material will be easily oxidized and decomposed by the chromium compound. Therefore, it is not preferable to use or preserve an aqueous metal-coating composition containing a hexa-valent chromium compound in acid state since the organic materials such as a polymer present in the composition together with the hexa-valent chromium compound will be decomposed by oxidation with the chromium compound, which reduces the stability of the coating composition and the properties of coating formed on metal surfaces. In particular, if a material having a hydroxyl group or double bonds which will be easily oxidized, such as an alkyd resin or polyvinyl alcohol is present together with a hexa-valent chromium compound in acid state, the functional groups will be easily decomposed by oxidation.

In the above-mentioned methods wherein a hexa-valent chromium compound is added in coating together with a tri-valent chromium compound, the method wherein a hexa-valent chromium compound is reduced into a tri-valent chromium compound at the formation of coating by baking gives excellent effects on the properties of cured coating. In other words, the method in which a water-soluble tri-valent chromium compound is added in a coating composition cannot utilize sufficiently the properties of the tri-valent chromium compound. Moreover, there is usually used chromium nitrate or chromium sulfate as a water-soluble tri-valent chromium compound and hence if such a tri-valent chromium compound is used, a sulfate ion or a nitrate ion is present in coating, which results in the reduction of the properties of coating. However, the method in which a reducing agent is added previously in a coating composition containing a hexa-valent chromium compound is also accompanied with many faults. That is, since a hexa-valent chromium compound is a strong oxidizing agent as mentioned above, if it is present together with a reducing agent, an oxidation-reduction reaction will occur during preservation and the hexa-valent chromium compound will be reduced into a tri-valent chromium compound, which makes it impossible to preserve the coating composition in a state containing the chromium compound in only a hexa-valent state. Moreover, since thus formed tri-valent chromium compound is insoluble in water and hence the compound is precipitated during preservation, it is impossible to form fine coating containing the tri-valent chromium compound uniformly and also the excellent properties of the tri-valent chromium compound cannot be sufficiently given to cured coating to improve the corrosion resistance, water resistance, alkali resistance and the like thereof.

From such a viewpoint, there has usually been adopted a method in which an aqueous solution of a reducing agent and an aqueous solution of a hexa-valent chromium compound are added directly before applying a coating composition on metal surfaces, but such a method is inconvenient in use and is unsuitable in the case of using a large amount of coating composition, in particular, in the case of high-speed continuous coating. Further, in the case of using as a reducing agent a water-soluble polyhydric alcohol such as sucrose which is stable to some extent even if it is present together with a hexa-valent chromium compound, the hexa-valent chromium compound will be easily reduced into a tri-valent chromium compound with such a reducing agent at the formation of coating by baking. However, in order to decompose by oxidation with the hexa-valent chromium compound a water-soluble polyhydric alcohol such as sucrose completely into a volatile material, coating must be baked for a long period of time at a high temperature and since the functional groups and double bonds of a polymer which will be easily oxidized will be decomposed by oxidation in such a condition, it reduces the properties of coating. Further, since the oxidation products of the reducing agent remain in coating in a condition by which the polymer present in coating is not oxidized, the properties of coating will be reduced. If a reducing agent, such as a lower alcohol or aldehyde, which does not leave oxidation products in coating, is used, the coating composition is not endowed with stability since the reducing agent is easily decomposed by oxidation. Moreover, as mentioned above, in the case of adopting a conventional aqueous metal-coating composition containing a copolymer together with a hexa-valent chromium compound or a tri-valent chromium compound, the thickness of coating by one step will be at most 5 microns except in some cases and hence such a conventional coating composition is used for only primer. Further, such a conventional aqueous metal-coating composition containing the chromium compound has a fatal fault that the alkali resistance of coating obtained from the coating composition is extremely low.

By the reasons as mentioned above, a conventional aqueous metal-coating composition containing the chromium compound has many defects and hence the high qualities of metal-coating cannot be obtained by such a conventional coating composition.

According to the present invention, the aqueous metal-coating composition comprises an aqueous solution or a water-dispersed emulsion of polymers and/or a polymer-cross linking agent mixture, containing the combination of functional groups capable of liberating low molecular reducing materials and forming the intermolecular cross-linkages of the polymers by a condensation reaction, and being added in an alkaline state with one or more chromium compounds, such as chromic anhydride, water-soluble chromates, and water-soluble bichromates.

The features of the present invention will now be described in detail. In causing the cross-linking reaction at the formation of coating by baking after applying the aqueous metal-coating composition of this invention on a metal surface, the above-mentioned hexa-valent chromium compound promotes the cross-linking reaction and at the same time the hexa-valent chromium compound is reduced by the reducing materials by-produced in the cross-linking reaction to form on the surface of metal to be treated coating containing a water-insoluble tri-valent chromium compound. Thus, since the tri-valent chromium compound is formed at the formation of coating, the chromium compound is very active and hence a fine coating of the tri-valent chromium compound is formed on a metal surface, which serves markedly the improvement of the properties of coating.

In order to achieve the objects of this invention, the polymer and/or the polymer-cross linking agent mixture used in the aqueous metal-coating composition of this invention must have such combinations that a reducing material, such as alcohol or aldehyde, is liberated at the cross-linking reaction (condensation reaction) for the formation of coating. The combinations are as follows:

(1) A water-soluble or water-dispersed cross-linking agent having two or more alkoxymethyl groups is incorporated in a water-soluble or water-dispersed polymer having one or more functional groups, such as carboxyl groups, methylol groups, and hydroxyl groups.

(2) A water-soluble or water-dispersed polymer having alkoxymethyl groups is incorporated in a water-soluble or water-dispersed polymer having one or more functional groups, such as carboxyl groups, methylol groups, and hydroxyl groups.

(3) A water-soluble or water-dispersed cross-linking agent having two or more carboxyl groups of methylol groups is incorporated in a water-soluble or water-dispersed polymer having alkoxymethyl groups.

(4) A water-soluble or water-dispersed polymer having alkoxymethyl groups together with one or more carboxyl groups, methylol groups and hydroxyl groups in the same molecule.

At that, by baking a water-soluble or water-dispersed polymer having an ammonium salt of carboxylic acid, ammonia is liberated to form carboxylic acid (carboxyl group) and hence the cross-linking reaction with the alkoxymethyl groups present together can be easily caused. Therefore, since in the present invention, a water-soluble or water-dispersed polymer having the ammonium salt of carboxylic acid may be used, the term carboxylic acid (carboxyl group) used in the specification and the claims includes the ammonium salt of carboxylic acid.

By adding one or more chromium compounds, such as chromic anhydride, water-soluble chromates, and water-soluble bichromates in an aqueous alkaline solution or a water-dispersed alkaline emulsion of the composition consisting of such a combination, the main components of the aqueous metal-coating composition of this invention can be formed.

As the water-soluble or water-dispersed polymer or cross-linking agent which are the base materials of this invention, there are shown as follows:

As a water-dispersed or water-soluble polymer having alkoxymethyl groups ($-CH_2OR$), there may be used a polymer of N-alkoxymethyl $\alpha \cdot \beta$-olefinic unsaturated amide, such as N-alkoxymethyl acrylamide, N-alkoxymethyl methacrylamide, and the like or a copolymer thereof with an additional-polymerizable unsaturated compound. A water-soluble polymer prepared by the reaction of a water-soluble polymer having amido groups with formaline and a low-molecular weight alcohol whereby amido groups being converted into an alkoxymethyl group may be used.

On the other hand, as a water-soluble or water-dispersed cross-linking agent having alkoxymethyl groups, there may be used the derivatives of melamine, urea, phenol and the like having two or more alkoxymethyl groups. At the reaction of the alkoxymethyl guorps ($-CH_2OR$) with carboxyl groups, methylol groups or hydroxyl groups, R is liberated as a reducing material such as an alcohol and is decomposed by oxidation with the hexavalent chromium compound. If the carbon number of the reducing material such as alcohol liberated at the reaction with carboxyl groups and the like is large, oxidation products will remain in coating at the decomposition by oxidation and then the most suitable carbon number of R is 1–4. However, in the case where an unsaturated alcohol having a double bond is liberated, the double bond is also decomposed by oxidation with the hexa-valent chromium compound. Accordingly, the carbon number in this case may be larger to some extent than that of R. From this view point, said R of the alkoxymethyl groups ($-CH_2OR$)

in the water-dispersed or water-soluble polymer or cross-linking agent is suitable —CH$_3$, —C$_2$H$_5$, —nC$_3$H$_7$, —isoC$_3$H$_7$, —nC$_4$H$_9$, —CH$_2$—CH=CH$_2$, and the like.

Then, as water-soluble or water-dispersed polymers and cross-linking agents each having one or more functional groups capable of liberating a reducing material such as an alcohol by the condensation reaction with alkoxymethyl groups e.g., carboxyl groups, methylol groups, hydroxyl groups, and the like, the following may be used in the present invention.

As the water-soluble or water-dispersed polymer having carboxyl groups, there is suitably used a polymer of an α,β-olefinic unsaturated carboxylic acid or a copolymer thereof with other addition-polymerizable unsaturated compound. As the α,β-olefinic unsaturated carboxylic acid, there may be used acrylic acid, methacrylic acid, crotonic acid, maleic acid, fumaric acid, and the like.

As the water-soluble or water-dispersed polymer having methylol groups, a polymer of an N-methylol α,β-olefinic unsaturated amide or a copolymer thereof with other addition-polymerizable unsaturated compound is suitable. As the N-methylol α,β-olefinic unsaturated amide, there may be used N-methylol acrylicamide, N-methylol methacrylic amide and the like.

As the water-soluble or water-dispersed polymer having hydroxyl groups, a polymer of an addition-polymerizable unsaturated compound having hydroxyl groups or a copolymer thereof with other addition-polymerizable unsaturated compound is suitable. As the polymerizable unsaturated compound having a hydroxyl group, there are α·β-olefinic unsaturated carboxylic acid 2-hydroxyethyls, such as 2-hydroxyethyl methacrylate and 2-hydroxyethyl acrylate. Besides, allyl alcohol and the like may be used as the addition-polymerizable unsaturated compound having hydroxyl group.

Further, the case may be applicable in this invention where a functional group is caused to react with other functional group during polymerization to form a hydroxyl group in the polymer. For example, if there exist in the emulsion polymerization system an addition-polymerizable unsaturated compound having a carboxyl group and an addition-polymerizable unsaturated compound having a glycidyl group, both functional groups are reacted to form hydroxyl groups by ring-opening of the glycidyl groups, whereby a water-dispersed copolymer having hydroxyl groups is obtained. In this case, as the addition-polymerizable unsaturated compound having a glycidyl group, there are glycidyl acrylate, glycidyl methacrylate, glycidyl crotonate, diglycidyl maleate, diglycidyl fumarate, diglycidyl itaconate, and allylglycidyl ether. As the addition-polymerizable unsaturated compound having a carboxyl group, the above-mentioned α·β-olefinic unsaturated carboxylic acid may be used. Further, an addition-polymerizable unsaturated compound having a carboxyl group and a glycidyl group simultaneously, for example, a monoglycidyl ester of maleic acid, fumaric acid, itaconic acid, and the like may be used. Further, a water-soluble or water-dispersed polymer having an alkoxymethylol group and one or more carboxyl group, methylol group, and hydroxyl group in a molecule may be produced by polymerizing a mixture of the above-mentioned addition-polymerizable unsaturated compounds each having each functional group. In this case, there may be used a copolymer with other addition-polymerizable unsaturated compound.

Furthermore, there may be used a water-soluble polymer prepared by reacting a water-soluble polymer containing amido groups and at least one of carboxyl groups, methylol groups, and hydroxyl groups with formaline and a low-molecular-weight alcohol whereby the amido group is converted into an alkoxymethyl group.

As the water-soluble or water-dispersed polymer having functional group, such as a hydroxyl group and a carboxyl group, various polymers, such as alkyd resin, a polyester resin, a vinyl monomer-denatured epoxy resin may be used.

As a cross-linking agent having carboxyl groups there may be used a water-soluble polybasic acid, such as maleic acid, adipic acid, itaconic acid, and succinic acid and as a cross-linking agent having methylol groups there may be used a derivative of melamine, urea, or phenol having at least two methylol groups. As a cross-linking agent having a hydroxyl group, it may be considered that a polyhydric alcohol, such as glycerol, ethylene glycol, etc., may be used, but the use of such an alcohol is not preferable since it reduces the stability of the coating composition by the reaction with the hexa-valent chromium compound during preservation.

In the above-mentioned water-soluble or water-dispersed polymer, as the addition-polymerizable unsaturated compound forming a copolymer with the addition-polymerizable unsaturated compound having a functional group, such as glycidyl group, a carboxyl group, a hydroxyl group, a methylol group and an alkoxymethyl group, there are a mono-vinyl aromatic hydrocarbon, an α·β-olefinic unsaturated carboxylic ester, an α·β-olefinic unsaturated nitrile, an α·β-olefinic unsaturated amide, and a diallyl ester of a dibasic acid.

As the mono-vinyl aromatic hydrocarbon, there are styrene and vinyl toluene. As the α·β-olefinic unsaturated carboxylic ester, there are acrylic ester, methacrylic ester, crotonic ester, maleic ester, itaconic ester, fumaric ester, and the like. As the kinds of the ester, there are methyl ester, ethyl ester, n-propyl ester, iso-propyl ester, n-butyl ester, iso-butyl ester, 2-ethylhexyl ester and the like.

As the α·β-olefinic unsaturated nitrile, acrylonitrile, methacrylonitrile, etc., may be used and as the α·β-olefinic unsaturated amide, acrylamide, methacrylamide, etc., may be used. As the α·β-olefinic unsaturated amide, there are acrylamide, methacrylamide and the like and as the diallyl ester of a dibasic acid, there are the diallyl esters of phthalic acid, iso-phthalic acid, terephthalic acid, adipic acid, sebacic acid, maleic acid, fumaric acid, itaconic acid, and the like. Besides them, the addition-polymerizable unsaturated compound, such as vinyl acetate, vinyl chloride, methylvinyl ether, etc., may be also used.

The hexa-valent chromium compound used in this invention may be chromic anhydride, a water-soluble chromate, or a water-soluble bichromate. As the water-soluble chromate, there may be suitably used sodium chromate, potassium chromate, ammonium chromate, calcium chromate, and magnesium chromate and as the water-soluble bichromate there may be suitably used sodium bichromate, potassium bichromate, ammonium bichromate, calcium bichromate, zinc bichromate, and barium bichromate.

Now, the compounding ratios of the aqueous metal-coating composition of this invention will be explained in detail.

In order to obtain a good result in this invention, the following component range is proper. First of all, it is preferable to use 1–75 parts by weight of the cross-linking agent consisting of the derivative of melamine, urea, or phenol having at least two alkoxymethyl groups to 100 parts by weight of the water-soluble or water-dispersed polymer having at least one functional group, such as a carboxyl group, a methylol group, and a hydroxyl group. Further, a suitable addition amount of the cross-linking agent to be used with the water-soluble or water-dispersed polymer having alkoxymethyl groups, that is, polybasic acids or the derivatives of melamine, urea, or phenol having at least two methylol groups is unity or less in the mol ratio of the carboxyl group or methylol group of said alkoxy-methyl group. Any mixing ratio may be adopted as the mixing ratio of the water-soluble or water-dispersed polymer having alkoxymethyl groups and the water-soluble or water-dispersed polymer having at least one carboxyl group, hydroxyl group, or methylol group. Further, in case where an excess amount of carboxyl groups, hydroxyl groups or methylol groups are present, a cross-linking agent consisting of the derivative of melamine, urea, or phenol having at least two alkoxymethyl groups may be added. The preferable addition amount of the cross-linking agent is 1–75 parts by weight based on 100 parts by weight of the water-soluble or water-dispersed polymer.

The proportion of the hexa-valent chromium compound is preferably 0.1–10 parts by weight to 100 parts by weight of the water-soluble of water-dispersed polymer having at least one alkoxymethyl group, carboxyl group, methylol group, or hydroxyl group.

The above-mentioned component ratios show the case of obtaining very good results or properties and the aqueous metal-coating composition having a component ratio outside the range shows a considerably good result but since it is accompanied with various drawbacks, it is a little inferior to the above-mentioned component range. For example, if the addition amount of the hexa-valent chromium compound is less than 0.1 part by weight, the characteristic of the chromium compound, such as corrosion inhibiting effect cannot sufficiently be obtained. However, the aqueous metal-coating composition having the latter composition or the component ratio outside the above-defined ratio is also excellent as compared with a conventional aqueous metal-coating composition.

If the addition amount of the cross-linking agent composed of the derivative of melamine, urea, or phenol having an alkoxy-methyl group is less than 1 part by weight, the properties of cured coating can not be improved so much. Further, if the amount is higher than 75 parts by weight, the density of cross-linkage is increased, which results in hardening coating and reducing workability and adhesive property of coating. If higher than equi mol proportion of the cross-linking agent composed of poly-basic acids or the derivative of melamine, urea, or phenol having at least two of methylol groups to the alkoymethyl group is added, the carboxyl group remains in coating and the water resistance and alkali resistance of coating are reduced. Accordingly, the amount is preferably the equi mol or less.

In the aqueous metal-coating composition of this invention there may desirably be added various additives necessary for coating material, such as pigments, plasticilers, viscosity-increasing agent and the like which have been used in a conventional metal-coating composition. The aqueous metal-coating composition of this invention added with such additives shows a good stability for preservation and gives very excellent coating. Moreover, the aqueous metal-coating composition of this invention may be used together with a water-soluble or water-dispersed acrylic copolymer, styrene-butadiene copolymer or vinyl acetate copolymer.

The procedure for adding the hexa-valent chromium compound in this invention is as follows: That is, if the system is in an alkaline state in the aqueous solution or aqueous dispersion of the composition containing the above-mentioned polymer or copolymer and the cross-linking agent, the hexa-valent chromium compound may be added in the system as it is. However, if the aqueous solution or aqueous dispersion of the above-mentioned composition is in acid state, the hexa-valent is preferably added after adjusting the system in an alkaline state. Further, if the above-mentioned aqueous solution or aqueous dispersion of the above-mentioned composition becomes acid by the addition of the hexa-valent chromium compound, the preservable stability of the composition is lowered and hence the pH of the system must be adjusted to an alkaline state by using an alkali-agent.

In some instances, when a solid or a concentrated aqueous solution of the hexa-valent chromium compound may be added in the water-dispersed emulsion, the emulsion is coagulated. Therefore, it is preferable in such a case to add slowly the chromium compound as the 5–25% aqueous solution in the aqueous solution or water-dispersed emulsion of the polymer while stirring sufficiently the system.

In order to make clear that the aqueous metal-coating composition of this invention has very excellent properties as compared with conventional aqueous metal-coating compositions and that the addition of the hexa-valent chromium compound promotes markedly the cross-linking reaction at the formation of coating of the aqueous metal-coating composition of this invention and coating having a large density of cross-linkage is easily formed by baking in a short period of time, the following experiments were conducted.

A water-dispersed emulsion of copolymer having carboxyl group and hydroxyl group (I) was prepared by polymerizing the system having the below-mentioned composition. The composition (I) was added with chronic anhydride as the hexa-valent chromium compound to give an aqueous metal-coating composition (II). The emulsion (I) was added with water-soluble hexamethoxymethyl melamine as the cross-linking agent having alkoxymethyl group to give an aqueous metal-coating composition (III). The aqueous metal-coating composition of this invention (IV) was prepared by adding chromium anhydride and water-soluble hexamethoxymethyl melamine in composition (I). These samples were tested to compare effects.

The water-dispersed emulsion (I) of copolymer having carboxyl group and hydroxly group was produced by the following manner;

| | Parts by weight |
|---|---|
| Styrene | 580 |
| Butyl acrylate | 300 |
| Glycidyl methacrylate | 40 |
| Acrylic acid | 80 |
| Water | 1500 |
| Sodium dioctylsulfo succinate | 20 |
| Polyoxynonyl phenyl ether | 20 |
| Potassium persulfate | 5 |

The water-dispersed emulsion having the above composition was subjected to polymerization reaction for 4 hours at temperature of 70° C. in a nitrogen-displaced sealed tube of a reduced pressure to give a water-dispersed emulsion with the polymerization rate of 100%. After finishing the polymerization, the product was filtered to remove some coagulated matters. Into 250 parts by weight of the water-dispersed emulsion were added 20 parts by weight of dibutyl phthalate (D.B.P.) and 5 parts by weight of a 20% aqueous solution of polyoxynonyl phenyl ether, and the system was shaked for 30 minutes and allowed to stand for 12 hours. The product was added with 12.5 parts by weight of 28% ammonia water to adjust the pH to 9.5. The viscosity of thus obtained emulsion, that is, sample (I) was 24 poises.

Sample (II) was obtained by adding 5 parts by weight of 20% chromic anhydride into 100 parts by weight of water-dispersed copolymer emulsion (I). Sample (III) was prepared by dissolving uniformly 10 parts by weight of an 80% aqueous solution of hexamethoxymethyl melamine into 100 parts by weight of water-dispersed copolymer emulsion (I). Sample (IV) or the aqueous metal-coating composition of this invention was prepared by dissolving uniformly with stirring 5 parts by weight of a 20% aqueous solution of chromic anhydride and 10 parts by weight of an 80% aqueous solution of hexamethoxymethyl melamine into 100 parts by weight of water-dispersed copolymer emulsion (I).

Each sample of the above-obtained water-dispersed copolymer emulsions was applied on a degreased cold-rolled steel plate having 0.4 mm. in thickness and the plate was baked for 3 minutes in a hot-blast drying furnace of 230° C. to give a coated steel plate having coating of 20–30 microns in thickness. Thus obtained coated steel plates were subjected to various tests, the results of which are shown in Table 1.

TABLE 1.—RESULTS OF TEST OF COATED COLD-ROLLED STEEL PLATE

| Test | I | II | III | IV |
|---|---|---|---|---|
| Salt-spray test | All rust in 80 hours | 5–10% rust in 300 hours | 30% rust in 100 hours | No change in 300 hours. |
| Erichsen cup test (10 mm. press) | No change | No change | Partially stripped | No change. |
| Du Pont impact test (1 kg.-50 cm.) | ___do___ | ___do___ | Considerable cracking | Do. |
| Knife scratch-Erichsen cup test (adhesion test) (500 g.-φ 6 mm.) | All attached | All attached | All attached | All attached. |
| Alkaline-resistance (10% aqueous NaOH solution) | Swelled in 24 hours | Swelled in 6 hours | Slightly discolored in 200 hours | No change after 500 hours. |
| Acid-resistance (10% aqueous $H_2SO_4$ solution) | Discolored in 100 hours | Discolored in 100 hours | ___do___ | Do. |
| Salt-resistance (10% aqueous NaCl solution) | Discolored in 40 hours | Discolored in 200 hours | ___do___ | Do. |
| Humidity test (95% humidity at 50° C.) | Whitened in 48 hours | Slightly discolored in 300 hours | Blackened in 100 hours | Do. |
| Boiling water resistance (above 95° C.) | Stripped in 2 hours | Discolored in 2 hours | Blackened in 2 hours | No change after 10 hours. |
| Abrasion-resistance [1] (Taber-test CS 17-1 kg.) | Above 50 times | 80 times | 130–150 times | Above 150 times. |
| Contamination-resistance | Good | Slightly no good | Slightly good | Good. |

[1] Rotation number by which metal surface is partially exposed.

By analysis of the above results, the tendency as shown in Table 2 can be obtained.

TABLE 2.—RESULTS OF ANALYSIS OF TABLE 1

| Ability | I | II | III | IV |
|---|---|---|---|---|
| Corrosion-resistance | X | ○ | △ | ◎ |
| Workability | ◎ | ◎ | △ | ◎ |
| Adhesiveness | ◎ | ◎ | ◎ | ◎ |
| Alkali-resistance | X | X | ○ | ◎ |
| Acid-resistance | X | ○ | ○ | ◎ |
| Salt-resistance | X | ○ | ○ | ◎ |
| Humidity and boiling-resistance | X | △ | X | ◎ |
| Contamination-resistance | X | △ | ○ | ◎ |
| Hardness of cured coating | X | △ | ○ | ◎ |

◎=Very excellent.
○=Slightly excellent.
△=Slightly inferior.
X=Very inferior.

The results show that sample (II) improved the corrosion resistance, acid resistance, brine resistance, high-temperature humidity resistance, and water resistance to some extent as compared with sample (I) but did not sufficiently improve the alkali resistance, contamination resistance, and hardness of coating.

In particular, the alkali resistance was very reduced by the addition of the chromic acid. On the other hand, by using sample (III) containing hexamethoxymethyl melamine, the alkali resistance and hardness of coating were improved as compared with the use of sample (I) but the corrosion resistance, workability, adhesive property, high-temperature resistance, humidity resistance, and water resistance were insufficient. In particular, the workability and the adhesive property were extremely reduced by the addition of hexamethoxymethyl melamine.

Thus, the aqueous metal-coating composition added with chromic anhydride or hexamethoxymethyl melamine improved some properties as compared with the use of sample (I) but some properties were reduced. Accordingly, they are not sufficient as a metal-coating composition. On the other hand, metal-coating composition (IV) of this invention was excellent in all the properties and the effectiveness of the sample is remarkably better than ones obtained by adding a hexa-valent chromium compound such as chromic anhydride or a cross-linking agent such as water-soluble hexamethoxymethyl melamine.

It is caused by the action of the hexa-valent chromium compound as mentioned above that the cross-linking reaction rate of the aqueous metal-coating composition of this invention is extremely higher than that of a conventional aqueous metal-coating composition. In order to make clear the cross-linking reaction promoting effect by the hexa-valent chromium compound, the coating obtained by an aqueous metal-coating composition containing an organic cross-linking agent and the coating obtained by the aqueous metal-coating composition of this invention were tested as to swelling ratio in benzene.

In general, if a linear high molecular compound has intermolecular cross linkages, the compound becomes insoluble in a solvent in which the original high molecular compound can be dissolved easily and the swelling ratio is reduced as the density of the cross linkage increases. On considering this fact, the measurement of swelling ratio was conducted as follows:

A water-dispersed emulsion having the components of 60 parts by weight of styrene, 32 parts by weight of butyl acrylate, 8 parts by weight of acrylic acid, 150 parts by weight of an aqueous surface active agent solution, 2 parts by weight of sodium dioctyl sulfosuccinate, and 2 parts by weight of polyoxyethylene nonylphenyl ether, was added with 0.5 part by weight of potassium persulfate and the system was reacted for 4 hours at the temperature of 70° C. in a nitrogen-displaced sealed tube using a rotary-type polymerizing thermostat bath to give a water-dispersing copolymer emulsion having about 40% solid. In to the emulsion was added 8 parts by weight of di-n-butyl phthalate as a plasticizer and after shaking the system for 1 hour by means of a shaking machine, the system was allowed to stand for 12 hours and the pH was then adjusted to 9.0–10.0 by using 28% ammonia water.

Sample (A) was prepared by uniformly dissolving 10 parts by weight of a water-soluble cross-linking agent, hexamethoxymethyl melamine into 100 parts by weight of the above-obtained water-dispersed copolymer emulsion having about 37% solid and a pH of 9.0–10.0.

Sample (B), the aqueous metal-coating composition of this invention, was prepared by uniformly dissolving 5 parts by weight of a 20% aqueous solution of chromic anhydride further in 100 parts by weight of sample (A).

Each of the samples were applied on a clear glass plate by using an applicator machine and the glass plate was dried by baking for various periods in a hot-blast drying furnace at 230° C. to give a free film from the glass plate. The film was immersed in benzene for 24 hours at 30° C. and then the swelling ratio was determined by measuring the length of sample.

That is, the swelling ratio was determined by the following formula;

$$S \text{ (percent)} = \frac{l_2 - l_1}{l_1} \times 100$$

where

S (percent: swelling ratio
$l_1$: length of sample before immersion
$l_2$: length of sample after immersion of 24 hours.

The relation between the swelling ratio determined by the formula and the period of time of baking is shown graphically in the accompanying figure.

From the measurement it was confirmed that the swelling ratio of sample (B) of this invention was substantially constant to baking periods. The swelling ratio of sample (A) was very large as compared with that of sample (B) and was reduced with the increase of baking period. This means that in the case of sample (B) of this invention, the cross-linking reaction was finished by a short period of baking and coating having a large cross linkage density was formed, whereas in the case of using sample (A), the cross-linking reaction did not sufficiently proceed in a short period of baking and cured coating having a large cross linkage density could not be formed.

From these results, it is clear that the hexa-valent chromium compound contributes remarkably to the promotion of cross-linking reaction.

The reasons that the aqueous metal-coating composition of this invention is excellent in various properties and by using the composition of this invention the cross-linking reaction at the formation of coating proceeds very quickly are as follows:

In general, it has been known that the condensation reaction of an alkoxymethyl group with a carboxyl group, methylol group or hydroxyl group is accelerated by the catalyst capable of liberating protons, such as phosphoric acid, fatty acid, or organic sulfonic acid. Also, the chemical equilibrium moves to the direction in which the condensation reaction proceeds by withdrawing the reaction product of the condensation reaction from the system.

On considering the cross-linking reaction of coating accompanied with such a condensation reaction, the reaction rate of cross-linking is extremely influenced with the coating formation step since the condensation reaction occurs in coating. In general, when a coating composition utilizing the kind of cross-linking reaction is applied on a metal surface followed by drying, the surface of coating is first dried and film is formed on the surface. Accordingly, the condensation product form by the cross-linking reaction in the coating is not easily withdrawn from the coating, which results in reducing the cross-linking reaction. Therefore, if the condensation product formed by the cross-linking reaction is quickly removed from coating by some manner, the chemical equilibrium moves to the direction in which the cross-linking reaction proceeds from a view point of chemical reaction rate theory, which results in accelerating the cross-linking reaction.

From this point of view, the action of the hexa-valent chromium compound which is a feature of the aqueous metal-coating composition of this invention will be explained.

If the aqueous metal-coating composition of this invention composed of the above-mentioned components is applied on a metal surface in an alkaline state followed by baking, the cross-linking reaction is caused and reduction products, such as alcohols and aldehydes are formed. During these products being diffused in coating, they are immediately decomposed by the above-mentioned hexa-valent chromium compound into water and carbon dioxide, which are removed from coating by evaporation.

As the result, the chemical equilibrium of the cross-linking reaction proceeds in the direction for forming condensation products considering from a chemical reaction rate theory and hence the cross-linking reaction is accelerated.

In this case, the hexa-valent chromium compound is reduced into tri-valent chromium compound. Also, in the case of using a volatile alkali agent and a hexa-valent chromium compound which liberates protons when dissolved in water, such as chromic anhydride, besides the cross-linking reaction accelerating effect by the decomposition by oxidation of the condensation product, the acceleration effect by the catalytic action of the hexa-valent chromium compound is added, which results in accelerating extremely, the cross-linking reaction.

When the aqueous metal-coating composition of this invention containing a hexa-valent chromium compound showing an acid property and a volatile alkali agent is applied on a metal surface and baked, the volatile alkali agent is volatilized, the coating becomes acid by the hexa-valent chromium compound, and the cross-linking reaction is accelerated by the catalytic action of the hexa-valent chromium compound. Moreover, since the hexa-valent chromium compound has a strong oxidizing power in an acidic state, the reducing materials by-produced in the cross-linking reaction are immediately decomposed by oxidation by the chromium compound. Therefore, by using the volatile alkali agent and the hexa-valent chromium compound showing an acid property at the same time, the cross-linking reaction is extremely accelerated by the acid-catalytic action of the hexa-valent chromium compound and the action of decomposing the condensation products formed in the cross-linking reaction. Thus, the above-combination has very excellent cross-linking accelerating effect as compared with a conventional acid catalyst, such as phosphoric acid, hydrochloric acid, and p-toluene sulfonic acid and then the most suitable combination in this invention.

On the other hand, a hexa-valent chromium compound having an alkaline property does not have the acid catalytic action for promoting the cross-linking reaction as well as the power for decomposing by oxidation of by-produced reducing materials is weak as compared with that of the hexa-valent chromium compound showing an acid property. However, since even in this case such a hexa-valent chromium compound showing an alkaline property can decompose by oxidation the reducing materials by-produced in the cross-linking reaction at baking, the cross-linking accelerating effect is better than a conventional catalyst used in such a kind of cross-linking reaction, such as phosphoric acid, fatty acid, and organic sulfonic acid.

The influence of a hexa-valent chromium compound showing an alkaline property on the properties of coating is less than that of a hexa-valent chromium compound showing an acid property but since the corrosion resistance and the like of coating are improved by the addition of the hexa-valent chromium compound showing an alkaline property, it can be sufficiently used in this invention as hexa-valent chromium compound.

Further, by using a hexa-valent chromium compound showing an alkaline property together with a hexa-valent chromium compound showing an acid property, the properties of coating can be improved as well as the cross-linking rate can be accelerated.

The conditions for the formation of coating by the aqueous metal-coating composition of this invention are influenced by the kind of metal to be coated, the thickness of metal plate to be coated, the efficiency of drying furnace and the like, but in the case of using a conventional hot-blast type drying furnace or infrared ray type drying furnace and using a metal plate of about 0.2–0.8 mm. in thickness, baking can be carried out for 3–30 minutes at the temperature range of 100–200° C. or 40 seconds to 3 minutes at the temperature range of 200–280° C. These conditions are the most suitable coating-forming conditions for advancing sufficiently the cross-linking reaction and giving the highest properties to coating. In particular, in the case of high-speed continuous coating, the latter coating-forming condition is suitable.

However, by other baking temperature and period than the above-mentioned conditions, the coating formation can be sufficiently conducted. Further, if a high-frequency induction heating furnace having a sufficient power is used, super high-speed continuous coating is applicable within a period of time less than 20 seconds. Furthermore, if a large scale steel is treated, the application of a baking procedure is difficult but in such a case normal-temperature drying may be adopted even though the properties of coating may be reduced to some extent.

Now, the use of the alkali agent in the aqueous metal-coating composition of this invention will be explained in detail.

Since a volatile alkali agent such as ammonia water can be easily removed completely from coating by drying, which gives various advantages for the improvement of the properties of cured coating, it is preferable to use the volatile alkali agent in this invention.

The behavior of the alkali agent in this invention is very important. That is, the oxidizing power of a hexa-valent chromium compound is strong in an acid state but is very weak in an alkaline state. Also, the cross-linking reaction in this invention can be remarkably accelerated in an acid state but is suppressed in an alkaline state. Accordingly, if the aqueous metal-coating composition of this invention is preserved by adding the alkali agent, the storage stability of the composition can be very improved since the decomposition by oxidation, coagulation and gelation of organic materials, such as a copolymer with the hexa-valent chromium compound can be prevented.

For example, if water-soluble hexamethoxymethyl melamine is added into the water-dispersed copolymer shown in below-mentioned Table 4 and thereafter an aqueous solution of chromic acid is added into the system in an acid state, the system is coagulated, but if the aqueous solution of chromic acid is added into the system after adjusting the pH of the system into an alkaline state by using an alkali agent such as ammonia water, the solution can be easily added without being accompanied with coagulation. Besides, by the presence of the alkali agent, the occurrences of decomposition by oxidation and coagulation can be prevented, which improves the storage stability.

Other advantages obtained by making system alkaline are as follows: If the aqueous metal-coating composition is, in an acid state, directly applied on a cold-rolled steel plate, iron is dissolved out of the steel plate, which reduces the properties of cured coating, coloring the cured coating into a light-brown color, and makes the formation of glossy and smooth coating impossible. Particularly, discoloration, crack, and deterioration are remarkable in the coating obtained by applying the water-dispersed coating composition in an acid state. However, if the coating composition is applied on a steel plate after adjusting into an alkaline state by using the alkali agent, the resolution of iron and the deterioration of cured coating can be prevented, the coating-forming property can be remarkably increased, and glossy and smooth cured coating can be obtained.

In the aqueous metal-coating composition of this invention, there is a most suitable pH range in accordance with the kind of the coating compositions. In order to obtain smooth and glossy cured coating using the water-dispersed coating composition, the pH is preferably 9–12. However, since in the case of the water-soluble coating composition, the viscosity of the composition is increased if the pH is high and it is very inconvenient in coating procedures, the pH is preferably in an alkaline state less than 10. Further, in the case of using the water-dispersed coating composition together with the water-soluble coating composition, the use of the system at a pH higher than 9 gives a suitable viscosity for coating procedure, whereby the coating procedure can be carried out very easily. In any case as mentioned above, since if the pH is higher than 12 the ester bonds, etc., in the polymer may be hydrolyzed during preservation for a long period of time, the pH is preferably lower than 12. Although, as mentioned above, the pH range of the aqueous metal-coating composition of this invention is preferably the above-mentioned one, it should be understood that the aqueous metal-coating composition of this invention may sufficiently be used in an alkaline range other than the above-defined one.

As to the features of the properties of coating obtained by the aqueous metal-coating composition of the present invention, all the properties are excellent. For example, in regard to corrosion resistance in a salt spray test, the cured coating of 20–30 microns in thickness formed by applying directly the coating composition of this invention on a degreased soft steel plate showed the corrosion resistance of 100–500 hours or more in a brine spray test and, in the case where the composition was applied on a phosphate treated steel plate or a galvanized steel plate, showed the corrosion resistance of 200–500 hours or more. As to the chemical resistance and solvent resistance, the cured coating has the durability of 300–800 hours or more in immersion test by various chemicals, such an an aqueous sodium hydroxide solution, sulfuric acid, brine, and ammonia water and by various solvents, such as aromatic solvents, alcoholic solvents, ketones, ethers, and halogens.

As regards the humidity resistance, no changes were observed on cured coating when the coating was subjected to a humidity resisting test at the humidity of above 98% and temperature of 50° C. for 300–500 hours or more and the workability and adhesive property of the coating were not reduced after the humidity resisting test of above 500 hours. As to workability, when the coated plate was subjected to a 5 mm. extrusion in Erichsen test, there occurred no stripping of cured coating, whitening, and powdering. Also, no changes occurred on coating in a bending test of 180 degree of 3 mm. in diameter. As regards the adhesive property, no stripping of coating occurred in a knife scratch test and in a scratch test. Further, the cured coating did not show stickiness at high temperatures and when the coating was contaminated with inks, lipsticks, crayons, and nicotines, they could be completely removed by cleaning with an organic solvent. Furthermore, when the cured coating was immersed in boiling water for 5–10 hours, the coating was not discolored. Also, the gloss, hardness, and wear resistance of the cured coating were excellent.

Thus, in the aqueous metal-coating composition of this invention, the cross-linking reaction is accelerated by the hexavalent chromium compound and a complete cross-linking structure is formed in cured coating, which gives very excellent properties to the coating.

Now, the composition showing best properties among various combinations for satisfying the objects of this invention is a combination of a water-dispersed emulsion of a copolymer having carboxyl groups and a water-soluble cross-linking agent having at least two alkoxymethyl groups added with a hexa-valent chromium compound. As the copolymer having carboxyl groups, the composition shown in the following table is most suitable.

TABLE 3.—COMPOSITIONS OF WATER-DISPERSED EMULSION COPOLYMER

| | I, Percent | II, Percent | III, Percent |
|---|---|---|---|
| Styrene | 50–75 | 50–65 | 50–65 |
| Butyl acrylate | 13–36 | 25–36 | 25–36 |
| Acrylic acid | 6–12 | 7–10 | 6–10 |
| Diallyl phthalate | | 2–6 | |
| Glycidyl methacrylate | | | 2–7 |

The composition showing the best ability is one prepared by adding 10.30 parts by weight of water-soluble hexamethoxymethyl melamine as the cross-linking agent having alkoxymethyl group in 100 parts by weight of the water-dispersed emulsion of copolymer having the composition shown in Table 3 and, after adjusting the pH of the system to 9.0–10.0 with the addition of 28% ammonia water, adding in the system 7.5–30 parts by weight of a 10–20% aqueous solution of chromic anhydride.

Now, the influences of each component of the copolymer of the water-dispersed emulsion having carboxyl groups, a representative copolymer of the composition of this invention on the properties of coating will be described together with the most suitable component range.

Styrene in the copolymer composition is a component for giving gloss, chemical resistance, hardness, water resistance, and alkali resistance to coating, but if the content of styrene is higher than 75%, the weathering durability, workability and adhesive property of coating are reduced. Therefore, in order to effectively utilize the property of styrene, the content is preferably 50–75%.

Butyl acrylate gives workability, gloss, weathering durability and chemical resistance to cured coating but since if the content is higher than 36% the contamination resistance and hardness are reduced, 13–26% is preferable. Acrylic acid forms a cross-linking structure in cured coating by the reaction with the methoxymethyl group of hexamethoxymethyl melamine while maintaining the effect for the adhesive property of coating, and at the same time liberates reducing materials which will reduce the hexavalent chromium compound. And, in order to obtain better properties of coating, such as excellent coating proceeding, adhesive property, workability and the like, the content of acrylic acid is preferably 6–12%. In addition, in order to obtain the sufficient ability of the aqueous metal-coating composition, acrylic acid, methacrylic acid, etc., are indispensable components.

Glycidyl methacrylate gives the chemical resistance, hardness, gloss, adhesive property, and weathering durability to cured coating but since if the content is higher than 8%, the workability is reduced, the content is preferably 2–8%. Diallyl phthalate gives the chemical resistance, humidity resistance, water resistance and heat resistance to cured coating but since if the content is higher than 6%, the polymerization reaction rate is lowered, the content is preferably 2–6%.

Further, if a very high workability is required in a metal plate coated with the aqueous metal-coating composition of this invention, it is better to add a plasticizer. As the plasticizer, dialkyl esters of phthalic acid, such as dibutyl phthalate and dioctyl phthalate are suitable. The addition amount of plasticizer is preferably 5–20 parts by weight to 100 parts by weight of the polymer in the aqueous metal-coating composition of this invention. At that, it should be noted that the workability of the coated metal with the aqueous metal-coating composition of this invention is excellent even in the case where no plasticizer is used.

In particular, if the aqueous metal-coating composition of this invention is used for top-coat and the like, pigment may be added. For example, when 20–40 parts by weight of titanium white is added to 100 parts by weight of the polymer of the aqueous metal-coating composition of this invention, the cured coating is endowed with sufficient binding power and gloss. In the case of other color than white being necessary, any desired color pigment may be used.

The range to which the aqueous metal-coating composition of this invention is applicable is vary wide, for example, it may be used as primers or finishing compostion for cold-rolled steel plates, chemically-treated steel plates, galvanized steel plates, chemically-treated galvanized steel plates, tinned steel plates and the like. Further, the coating composition mixed with a coloring agent such as a pigment may be applied in a comparatively thick thickness. Therefore, the coating composition may be used as a coating agent for colored metal plates and by applying the coating composition on the metal plates, coated metal plates having excellent properties can be obtained.

Also, there is an intimate relation between the solid content in the aqueous metal-coating composition of this invention and the use thereof. That is, as the use of primer of a thickness of coating less than 5 microns, the content of solid is most suitably 5–10%, while as a top-coat of a comparatively thin coating of about 5–15 microns, the use of 10–30% in solid content is most suitable and as a top-coat of one-step coating having a comparatively thick coating of above 15 microns, the most suitable solid content is 30–60%.

Since, as mentioned above, the aqueous metal-coating composition of this invention has very excellent properties, the coated steel plate obtained by directly applying the composition on a degreased cold-rolled steel plate has also very excellent properties, such as corrosion resistance, weathering durability, workability, adhesive property, chemical resistance and the like as compared with those obtained by applying a conventional coating composition on a galvanized steel plate. Though, if a coated steel plate obtained by directly applying the aqueous metal-coating composition of this invention is scratched to a base metal, some red rust will flow out from the scratches of the coating during preserving for a long period of time, it can be prevented by using as the base metal an electro-galvanized steel plate having a zinc plate layer of a thickness of about $\frac{1}{10}$ of that of usual galvanized steel plate. Thus, an electro-galvanized steel plate having a very thin zinc plate layer coated with the aqueous metal-coating composition of this invention has very excellent properties as compared with conventionally coated zinc-galvanized steel plates.

Further, a tinned steel plate coated with the aqueous metal-coating composition of this invention can be sufficiently used as material for making cans and even if the tin layer of the tinned steel plate is much thinner than that of usual tinned steel plates, it can be used, by applying the coating composition of this invention on the surface, as an excellent material for making cans.

If an aluminum plate or a copper plate transparently coated with the coating composition of this invention is used, there is provided a very beautiful article in co-operation with the brightness of the base metal. Furthermore, the aqueous metal-coating composition of this invention shows very high adhesive property to a steel plate the surface of which has been treated with phosphoric acid and the like. In the case of using the aqueous metal-coating composition of this invention as primer, the adhesive property of the primer is good to a finishing coating composed of the coating composition of this invention added with a pigment as well as to other finishing coating, such as alkyd coating, phenolic coating, melamine coating, and acrylic coating.

In order to obtain continuously coated steel plates having smooth coating surfaces, by using the aqueous metal-coating composition of this invention, it is desirable to coat coiled steel sheets by means of a coating machine of reverse roll type. Moreover, by using a reverse roll coater, a high-speed continuous coating can be conducted with a line speed of about 0.25–1.5 m./sec.

The presence of a tri-valent chromium compound in the coating obtained from the aqueous metal-coating composition of this invention has been confirmed by the following matters.

In general, if a hexa-valent chromium compound is present alone in coating, the color of the coating is yellow but if a tri-valent chromium compound is present in coating, the color of the coating is yellow-green and the color becomes green as the concentration of the tri-valent chromium compound in the coating is increased.

If a coating formation is conducted using a cross-linking agent without the liberation of reducing materials together with a hexa-valent chromium compound, the color of thus formed coating is yellow but if a coating formation is conducted using a cross-linking agent capable of liberating reducing materials as in this invention together with a hexa-valent chromium compound, the coating becomes yellow-green. From the facts, it is clear that in the case of using the aqueous metal-coating composition of this invention, the hexa-valent chromium compound in the composition is converted into a tri-valent chromium compound by the reducing materials formed by the cross-linking reaction at the formation of coating and hence the tri-valent chromium compound is present in the cured coating.

Since the stability of a hexa-valent chromium compound is reduced if a reducing material such as an alcohol is present from the first in the aqueous metal-coating composition of this invention, it is undesirable. Therefore, as the water-soluble or water-dispersed polymer or as the cross-linking agent having an alkoxymethyl group, there is preferably used a material from which reducing materials such as alcohols having been completely removed.

Production of the water-dispersed emulsion of copolymers

The component ratios of the water-dispersed copolymer that can be used in the aqueous metal-coating composition of this invention are shown in following Table 4 and a preferred example for the production of the water-dispersed emulsion of copolymer will be described below.

TABLE 4.—COMPONENT RATIO OF WATER-DISPERSED COPOLYMER EMULSION (WEIGHT RATIO)

| Monomer | Sample No. | | | | | | |
|---|---|---|---|---|---|---|---|
| | I | II | III | IV | V | VI | VII |
| Styrene | 60 | 75 | 60 | 58 | 60 | 60 | 60 |
| Butyl acrylate | 32 | 13 | 30 | 30 | 26 | 30 | 36 |
| Glycidyl methacrylate | | | 4 | 4 | | | |
| Acrylic acid | 8 | 12 | 6 | 8 | 8 | 7 | 1 |
| Diallyl phthalate | | | | | 6 | 3 | 1 |
| N-methylol acrylamide | | | | | | | 3 |
| Water | 146 | 148 | 120 | 146 | 146 | 120 | 146 |
| Anionic surfactant (Sodium dialkyl sulfo succinate) | 2 | 1 | 2 | 2 | 2 | 2 | 2 |
| Nonionic surfactant (Polyoxyethylene nonylphenyl ether) | 2 | 1 | 2 | 2 | 2 | 2 | 2 |
| Potassium persulfate | 0.5 | 0.5 | 0.5 | 0.5 | 0.5 | 0.5 | 0.5 |

Each of the compositions shown in Table 4 was completely emulsified in a nitrogen-displaced sealed tube having a reduced pressure and was polymerized for 3–5 hours at 65–75° C. using a rotary-type polymerization bath having a thermostat to give a water-dispersed copolymer emulsion having 40–45% solid content.

In order to make thus obtained emulsion suitable for metal-treating compositions, the following procedure was conducted.

First of all, after removing some coagulated materials, if any, by filtration, 8–20 parts by weight of dialkyl phthalate (di-n-butyl phthalate) as a plasticizer was added into the emulsion containing 100 parts by weight of the copolymer and after shaking the system for 30 minutes by means of a shaker, the system was allowed to stand for 12 hours and then pH of the system was adjusted to 9–10 by adding ammonia water with stirring.

The compositions of thus obtained water-dispersed copolymer emulsions are shown in following Table 5, which are used in latter-described examples.

TABLE 5.—COMPOSITION OF THE EMULSION FOR METAL-COATING (WEIGHT PERCENT)

| | I | II | III | IV | V | VI | VII |
|---|---|---|---|---|---|---|---|
| Water-dispersed copolymer emulsion in Table 4 | 250 | 250 | 224 | 250 | 250 | 224 | 250 |
| Dibutyl phthalate | 20 | 20 | 10 | 10 | 8 | 8 | 10 |
| 28% ammonia water | 12.5 | [1]25 | 12.5 | 12.5 | 12.5 | 12.5 | 12.5 |

[1] 15% ammonia water.

Production of water-soluble copolymers

An example of the component ratios of the water-soluble acrylic copolymer used in the aqueous metal-coating composition of this invention consists of 40% methyl methacrylate, 50% butyl acrylate and 10% acrylic acid.

Into 100 parts by weight of isopropyl alcohol was dissolved 100 parts by weight of the above monomer mixture and after adding 0.5 part by weight of $\alpha \cdot \alpha'$-azobisisobutyronitrile, the system was polymerized for 5 hours at 85° C. in a nitrogen stream. After the reaction was finished, the product was cooled to room temperature and the system was stirred uniformly while adding 30 parts by weight of 28% ammonia water. Further, into the product was added 170 parts by weight of water to give a uniform aqueous solution. The aqueous solution was concentrated by means of a rotary evaporator until the solid content became 80%.

The concentrated aqueous solution was dried by freeze-drying to give 100 parts by weight of the powders of the copolymer. To 100 parts by weight of the powders was added 233 parts by weight of 5% ammonia water and when the system was slightly heated and stirred, the copolymer powders were completely dissolved to form an aqueous solution thereof.

Synthesis of water-soluble or water-dispersed cross-linking agent having alkoxymethyl group As the water-soluble cross-linking agent to be used in the examples of this invention, hexamethoxymethyl melamine synthesized from hexamethylol melamine and methanol or di-N-methoxymethyl urea synthesized from dimethyl urea and methanol may be synthesized by a known method. As the water-dispersing cross-linking agent used in this invention, hexa-n-butoxymethyl methylol melamine synthesized from hexamethylol melamine and n-butyl alcohol of hexaallylated methylol melamine synthesized from hexamethylol melamine and allyl alcohol may be synthesized by a known method, from which reducing materials such as alcohols are completely removed. In case of the cross-linking agent being insoluble in water, it is to be used by adding the same into a water-dispersed emulsion and dispersed therein by a mechanical manner. In addition, the water-insoluble cross-linking agent composed of the derivative of melamine, urea, phenol, etc., can be easily mixed in the water-dispersed emulsion of copolymer by dissolving it in a water-insoluble organic solvent, such as, benzene, toluene, and xylene, dispersing the organic solvent solution in an aqueous solution of a surface active agent, and then adding the dispersion into the water-dispersed emulsion of copolymer.

EXAMPLE 1

A 20% aqueous solution of chromic acid was slowly added into the water-dispersed copolymer emulsion (pH 9–10) of the composition shown in Table 1 while stirring by means of a mixer. In the emulsion was dissolved an 83% aqueous solution of hexamethoxymethyl melamine completely with stirring and after adding titanium white, the mixture was kneaded for 72 hours in a ball mill. After allowing to stand for one week, thus obtained composition was applied on the degreased cold-rolled steel plates continuously by using a reverse roll coater machine and they were immediately baked for 60 second at 250° C. in a hot blast type drying furnace. Immediately after withdrawn from a drying furnace thus coated steel plates were quenched by spraying water and passed through rolls to remove water followed by drying to give very

TABLE 6.—COMPOSITION OF COATING (WEIGHT RATIO)

| | I | II | III | IV | V | VI | VII |
|---|---|---|---|---|---|---|---|
| Water-dispersed copolymer emulsion in Table 5 | 282.5 | 295 | 246.5 | 272.5 | 270.5 | 244.5 | 272.5 |
| 20% aqueous chromic acid solution | 12.5 | 12.5 | 12.5 | 12.5 | 12.5 | 12.5 | 12.5 |
| 83% aqueous solution of hexamethoxymethyl melamine | 30 | 30 | 30 | 30 | 30 | 30 | 30 |
| Titanium white (rutile type powder) | 30 | 30 | 30 | 30 | 30 | 30 | 30 | glossy white coated steel plates. The average thickness of coating was 20-30 microns. In addition, the composition of the coating compositions used for coating in this example are shown in Table 6.

EXAMPLE 2

About the white coated steel plates coated with the coating compositions shown in Table 6 in Example 1 were conducted various tests. The results are shown in Table 7.

TABLE 7.—RESULTS OF QUALITY OF VARIOUS COATED GALVANIZED STEEL PLATES

| Test | Test Conditions | Sample I | II | III | IV | V | VI |
|---|---|---|---|---|---|---|---|
| Corrosion-resistance (Salt-spray): | | | | | | | |
| Non-worked portion | 800 hours | No change | No change | No change | No change | No change | No change. |
| Erichsen-cup portion (5 mm. press) | do | do | do | do | do | do | Do. |
| Cross-out portion | 300 hours | Rust in 1-2 mm. width | Rust in 1-2 mm. width | Rust in 1-2 mm. width | Rust in 1-2 mm. width | Rust in 1-2 mm. width | Rust in 1-2 mm. width. |
| Workability and adhesiveness: | | | | | | | |
| Erichsen cup-test | 10 mm. press | No change | No change | No change | No change | No change | No change. |
| Du Pont impact-test | 7 mm. press | do | do | do | do | do | Do. |
| Knife scratch-Erichsen cup-test (adhesion test) | 1 kg.-50 cm. 1 mm. x 1 mm. sq. 10 x 10 portion 5 mm. press | All attached | All attached | All attached | All attached | All attached | All attached. |
| Chemical resistance: | | | | | | | |
| Alkali-resistance | 10% aq. NaOH solution 5% aq. NaOH solution | No change in 500 hours | No change in 500 hours | No change in 1,000 hours | No change in 1,000 hours | No change in 800 hours | No change in 800 hours. |
| Acid resistance | 10% aq. H₂SO₄ 5% aq. H₂SO₄ solution | do | do | do | do | do | Do. |
| Salt-resistance | 10% aq. NaCl solution 5% aq. NaCl solution Room temperature | do | do | do | do | do | Do. |
| Pencil hardness test | | 5H | 6H | 5H | 5H | 5H | 6H |
| Specular Gloss test | 60° reflection-coefficient | 83° | 85° | 83° | 84° | 85° | 85° |

Solvent resistance test: Each sample in Example 1 was immersed in organic solvents, such as benzene, toluene, xylene, methanol, n-butyl alcohol, acetone, methyl ethyl ketone, methyl isobutyl ketone, ethyl acetate, carbon tetrachloride, chloroform, and gasoline for 500 hours each, no stripping of coating occurred.

High-temperature adhesive property: When each sample in Example 1 was allowed to stand for 24 hours at 100° C., the coating showed no stickiness.

Contamination resistance: The coating of each sample in Example 1 was stained by nicotines, crayons, lipsticks, inks and the like and then cleaned with acetone, no stains were left.

EXAMPLE 3

Each of the white coating compositions in Example 1 was continuously applied on a cleaned galvanized steel plate in the same manner as in Example 1 to give the white coated galvanized steel plate having the coating thickness of 20-30 microns. The coating was very glossy. Various tests were conducted about thus obtained coated galvanized steel plates, the results being shown in Table 8.

TABLE 8.—RESULTS OF TESTS OF VARIOUS COATED GALVANIZED STEEL PLATES

| Test | Test-condition | Sample I | II | III | IV | V | VI | VII |
|---|---|---|---|---|---|---|---|---|
| Corrosion resistance (Salt-spray test): | | | | | | | | |
| Non-worked portion | 800 hours | No change | No change | No change | No change | No change | No change | No change. |
| Erichsen-cup portion (5 mm. press) | do | do | do | do | do | do | do | Do. |
| Cross-cut portion | 300 hours | Slight white rust | Slight white rust | Slight white rust | Slight white rust | Slight white rust | Slight white rust | Slight white rust. |
| Workability and adhesiveness: | | | | | | | | |
| Erichsen cup-test | 10 mm. press | No change | No change | No change | No change | No change | No change | No change. |
| Du Pont impact-test | 7 mm. press | do | do | do | do | do | do | Do. |
| Knife scratch-Erichsen-cup test (adhesion test) | 1 kg.-50 cm. 1 mm. x 1 mm. sq. 10 x 10 portion 5 mm. press | Excellent (all attached) | Excellent (all attached) | Excellent (all attached) | Excellent (all attached) | Excellent (all attached) | Excellent (all attached) | Excellent (all attached). |
| Humidity-resistance | 500 hours | No change | No change | No change | No change | No change | No change | No change. |
| Boiling water-resistance | 15 hours | do | do | do | do | do | do | Do. |

In addition, the properties of coating, such as, alkali resistance, acid resistance, brine resistance, hardness of coating, and gloss were also excellent as in Table 7.

EXAMPLE 4

Into 100 parts by weight of the water-dispersed copolymer emulsion (I) shown in Table 5 were dissolved 10 parts by weight of water-soluble di-N-methoxymethyl urea and 10 parts by weight of a 10% aqueous solution of ammonium chromate by the manner same as in Example 1 and the coating composition was applied on a cleaned galvanized steel plate by using an applicator coating machine followed by baking for 3 minutes at 230° C. in a hot blast type drying furnace to give the coated galvanized steel plate. The average thickness of coating was 20–30 microns.

EXAMPLE 5

Into 100 parts by weight of the water-dispersed copolymer emulsion (III) in Table 5 was added 15 parts by weight of hexabutoxy melamine and dispersed completely by using a homo-mixer.

Into the dispersion was added 5.5 parts by weight of a 20% aqueous solution of zinc bichromate. Thus obtained coating composition was applied on a cleaned galvanized steel plate by means of an applicator coating machine followed by baking for 3 minutes at 230° C. in a hot blast type drying furnace to give the coated galvanized steel plate. The average thickness of coating was 20–30 microns.

EXAMPLE 6

The water-dispersed type copolymer emulsion coating (I) shown in Table 6 in Example 1 was applied by means of an applicator coating machine on steel plates that had been chemically treated with a phosphate followed by baking for 1 minute at 250° C. to give coated chemically-treated steel plates.

EXAMPLE 7

Into 100 parts of the water-dispersed copolymer emulsion (V) in Table 5 were added 17 parts by weight of hexaallylated methylol melamine and 5 parts by weight of a 20% aqueous ammonium chromate solution by the manner as in Example 5. Thus obtained coating composition was applied on a cleaned galvanized steel plate by means of an applicator coating machine and baked for 3 minutes at 230° C. in a drying furnace to give the coated galvanized steel plate.

EXAMPLE 8

Into 100 parts by weight of a 30% aqueous solution of the acrylic water-soluble copolymer as mentioned above was added 8 parts by weight of hexamethoxymethyl melamine and the mixture was added with 7.5 parts by weight of a 10% aqueous ammonium chromate solution to give a uniform solution. The coating composition was applied on a cleaned galvanized steel plate by means of an applicator coating machine and baked for 3 minutes at 150° C. and further for 2 minutes at 200° C. to give the coated galvanized steel plate.

EXAMPLE 9

The coated galvanized steel plates obtained in Examples 4–8 had glossy, smooth and hard coatings and these coatings were colored in yellow-green in some extent. These coated galvanized steel plates were subjected to a salt spraying test. The results are shown in Table 9.

TABLE 9.—RESULTS OF CORROSION-RESISTANCE OF COATED GALVANIZED STEEL PLATES
[Salt-spray test; 300 hours]

| Test | Example | | | | |
|---|---|---|---|---|---|
| | 4 | 5 | 6 | 7 | 8 |
| Non-worked portion | No change | No change | No change | No change | No change. |
| Erichsen-cup portion (5 mm. press). | do | do | do | do | Do. |
| Cross-cut portion | Slight white rust | Slight white rust | Slight white rust | Slight white rust | [1] |

[1] White rust of 1–2 mm. in width.

EXAMPLE 10

The water-dispersed emulsion (V) coating composition that had been prepared in Example 1 was applied on a cleaned galvanized steel plate by means of an applicator coating machine and baked for 2 minutes at 20° C. in a hot blast type drying furnace. Thus coated plated was compared in test with a coated galvanized steel plate by using a marketed conventional metal-coating composition and a marketed colored galvanized steel plate. The results are as follows:

(A) Coated galvanized steel plate applied with the aqueous metal-coating composition of this invention.

(B) A galvanized steel plate coated with a thermosetting acrylic solvent-type coating composition (commercially available "Mazicron #600") and baked for 5 minutes at 220° C.

(C) A galvanized steel plate coated with a thermosetting acrylic aqueous solution type coating composition (commercially available "Acrysol #2004") and baked for 5 minutes at 220° C.

(D) A colored galvanized steel plate (commercially available) coated by a thermo-setting alkyd resin paint.

(E) A colored galvanized steel plate (commercially available) coated by a thermo-setting acrylic solvent type paint.

(F) A colored galvanized steel plate (commercially available) coated by an aqueous metal-coating composition (water-dispersed styrene-butadiene copolymer emulsion added with chromium trioxide).

The results are shown in Table 10.

TABLE 10.—RESULTS OF TESTS OF VARIOUS COATED GALVANIZED STEEL PLATES

| Test | Test condition | A | B | C | D | E | F |
|---|---|---|---|---|---|---|---|
| Corrosion-resistance | Salt-spray test | No change in 800 hours | No change in 800 hours | Slight white rust in 100 hours | Considerable blister in 100 hours | Slightly blister in 100 hours | No change in 200 hours |
| Erichsen-cup test | 100 mm. press | No change | No change | No change | No change | No change | No change |
| Acid-resistance | 5% aq. H₂SO₄ solution | No change in 800 hours | No change in 100 hours | Discoloring with blister in 100 hours | Considerable blister in 100 hours | do | Partially dissolved in 100 hours |
| Alkali-resistance | 5% aq. NaOH solution | do | Considerable blister in 100 hours | Considerable blister in 100 hours | Stripped in 30 minutes | Considerable blister and stripped in 50 hours | Dissolved in 72 hours |
| Salt-resistance | 5% aq. NaCl solution | do | Slightly change in 100 hours | Slightly change in 100 hours | Blister in 24 hours | Considerable blister in 48 hours | No change |
| Humidity-resistance | 98% humidity at 50° C | No change in 500 hours | | All dissoloring in 100 hours | | | |
| Boiling water-resistance | Above 95° C | No change in 15 hours | Discolored in 20 minutes | All dissoloring in 5 hours | Discoloring in 30 minutes | Slightly discoloring in 3 hours | Discoloring in 30 minutes |

What is claimed is:

1. A single-liquid type aqueous metal-coating composition said composition having an alkaline pH and comprising an aqueous solution or dispersion of (1) a polymer containing a functional group (A) selected from the group consisting of carboxyl group, hydroxyl group, methylol group and a combination of these functional groups, (2) a cross-linking agent containing, as a functional group (B), an alkoxymethyl group and (3) at least one water-soluble hexavalent chromium compound said compound being present in a proportion of 0.1 to 10 parts by weight based on 100 parts by weight of the said polymer.

2. A single-liquid type aqueous metal-coating composition said composition having an alkaline pH and comprising an aqueous solution or dispersion of (1) a polymer containing a functional group (A) selected from the group consisting of carboxyl group, hydroxyl group, methylol group and combinations of these functional groups, (2) a polymer containing, as a functional group (B), an alkoxymethyl group and (3) at least one water-soluble hexavalent chromium compound said compound being present in a proportion of 0.1 to 10 parts by weight based on 100 parts by weight of said polymers.

3. A single-liquid type aqueous metal-coating composition said composition having an alkaline pH and comprising an aqueous solution or dispersion of (1) a polymer containing, as a functional group (B), an alkoxymethyl group, (2) a cross-linking agent containing a functional group (A) selected from the group consisting of carboxyl group, hydroxyl group, methylol group and combinations of these functional groups, and (3) at least one water-soluble hexavalent chromium compound said compound being present in a proportion of 0.1 to 10 parts by weight based on 100 parts by weight of the said polymer.

4. A single-liquid type aqueous metal-coating composition, said composition having an alkaline pH and comprising an aqueous solution or dispersion of (1) a polymer containing a combination of a functional group (A) and a functional group (B), group (A) being selected from the group consisting of carboxyl group, hydroxyl group, methylol group and a combination thereof and group (B) being an alkoxymethyl group, and (2) at least one water-soluble hexavalent chromium compound said compound being present in a proportion of 0.1 to 10 parts by weight based on 100 parts by weight of polymer.

5. A single-liquid type aqueous metal-coating composition as in claim 1 wherein the polymer containing a functional group is a copolymer having carboxyl group prepared from monomers selected from the class consisting of an α·β-olefinic unsaturated carboxylic acid, a monovinyl aromatic hydrocarbon, an α·β-olefinic unsaturated carboxylic ester, a diallyl compound, and a glycidyl vinyl compound and the cross-linking agent is at least one water-soluble cross-linking agent selected from the class consisting of a melamine derivative, a urea derivative, and a phenol derivative, said derivative having at least two alkoxymethyl groups said agent being present in a proportion of 1–75 parts by weight based on 100 parts by weight of the polymer having carboxyl group.

6. A single-liquid type aqueous metal-coating composition as in claim 5 wherein the α·β-olefinic unsaturated carboxylic acid is selected from the class consisting of acrylic acid, and methacrylic acid; said monovinyl aromatic hydrocarbon is selected from the group consisting of styrene and vinyl toluene; the α·β-olefinic unsaturated carboxylic ester is selected from the class consisting of acrylic ester and methacrylic ester; the glycidyl vinyl compound is an α·β-olefinic unsaturated glycidyl carboxylate; the diallyl compound is the diallyl ester of a dibasic acid; the water-soluble cross-linking agent is an alkoxymethyl melamine having at least two alkoxymethyl groups; and the water-soluble hexavalent chromium compound is selected from the class consisting of chromic anhydride, ammonium chromate, ammonium bichromate, and zinc bichromate.

7. A single-liquid type aqueous metal-coating composition as in claim 6 wherein the α·β-olefinic unsaturated glycidyl carboxylate is at least one member selected from the group consisting of glycidyl acrylate and glycidyl methacrylate; the diallyl ester of dibasic acid is diallyl phthalate; and the alkoxymethyl melamine is hexamethyoxymethyl melamine.

8. A single-liquid type aqueous metal-coating composition as in claim 5 wherein the polymer having carboxyl group consists of 6–12% by weight of at least one member selected from the group consisting of acrylic and methacrylic acid, 50–75% by weight of at least one member selected from styrene and vinyl toluene, and 13–36% by weight of at least one member selected from acrylic ester and methacrylic ester.

9. A single-liquid type aqueous metal-coating composition as in claim 5 wherein the polymer having carboxyl group consists of 7–10% by weight of at least one member selected from acrylic acid and methacrylic acid, 50–65% by weight of at least one member selected from styrene and vinyl toluene, 25–36% by weight of at least one member selected from acrylic ester and methacrylic ester, and 2–6% by weight of diallyl phthalate.

10. A single-liquid type aqueous metal-coating composition as in claim 5 wherein the polymer having carboxyl group consists of 6–10% by weight of at least one member selected from the group consisting of acrylic acid and methacrylic acid, 50–60% by weight of at least one member selected from acrylic ester and methacrylic ester, and 2–7% by weight of a member selected from glycidyl methacrylate and glycidyl acrylate.

11. A single-liquid type aqueous metal-coating composition as in claim 5 wherein the monomers forming the polymer having carboxyl group are selected from the group consisting of styrene, butyl acrylate, acrylic acid, diallyl phthalate, and glycidyl methacrylate; the water-soluble cross-linking agent is hexamethoxymethyl melamine; the hexavalent chromium compound is chromic anhydride; the alkali agent present to achieve alkaline pH is ammonia water, and the pH of the composition is 9.0–10.0.

12. A method for preparing a single-liquid type aqueous metal-coating composition as in claim 11 wherein a water-dispersed emulsion is prepared by adding 10–30 parts by weight of hexamethoxymethyl melamine to 100 parts by weight of the polymer of the water-dispersed emulsion; the pH of the system is adjusted to 9–10 with 28% ammonia water and 7.5–15 parts by weight of a 20% aqueous chromic anhydride solution is added.

13. A single-liquid type aqueous metal-coating composition as in claim 11 containing 5–20 parts by weight of dibutyl phthalate as a plasticizer in 100 parts by weight of the polymer having carboxyl group.

14. A single-liquid type aqueous metal-coating composition as in claim 11 containing 20–40 parts by weight of titanium white as a pigment in 100 parts by weight of the polymer having carboxyl group.

15. A process for forming coating on a metal surface which comprises applying to a metal surface an aqueous coating composition as in claim 1 and baking the thus coated metal surface under the temperature conditions and for a period of time necessary to form a cross-linking structure in the coating.

16. A process for forming coating on a metal surface which comprises applying to a metal surface an aqueous coating composition as in claim 2 and baking the thus coated metal surface under the temperature conditions and for a period of time necessary to form a cross-linking structure in the coating.

17. A process for forming coating on a metal surface which comprises applying to a metal surface an aqueous coating composition as in claim 3 and baking the thus coated metal surface under the temperature conditions and for a period of time necessary to form a cross-linking structure in the coating.

18. A process for forming coating on a metal surface which comprises applying to a metal surface an aqueous coating composition as in claim 4 and baking the thus coated metal surface under the temperature conditions and for a period of time necessary to form a cross-linking structure in the coating.

19. A process for forming a coating on a metal surface which comprises applying to the surface of a thin metal plate an aqueous metal-coating composition as in claim 5 and baking the thus coated metal plate for from 40 sec. to 3 minutes at a temperature of from 200 to 280° C., thereby forming a cross-linking structure in the coating.

20. An article having a metal surface coated with a composition of claim 1.

21. An article having a metal surface coated with a composition of claim 2.

22. An article having a metal surface coated with a composition of claim 3.

23. An article having a metal surface coated with a composition of claim 4.

24. An article as in claim 20 wherein the metal material surface is selected from the group consisting of a degreased soft steel plate, a phosphate treated steel plate, a galvanized steel plate, a phosphate treated galvanized steel plate, a tin-coated steel plate, an aluminum plate, an aluminum-coated steel plate, a copper plate, copper-plated steel plate, and stainless steel plate.

References Cited

UNITED STATES PATENTS

| | | | |
|---|---|---|---|
| 3,036,934 | 5/1962 | Horton | 148—6.2 X |
| 3,094,435 | 6/1963 | Schuster et al. | 148—6.2 X |
| 3,140,204 | 7/1964 | Tokunaga et al. | 148—6.2 |
| 3,175,964 | 3/1965 | Watanabe et al. | 148—6.2 X |
| 3,189,489 | 6/1965 | Schiffman | 148—6.2 |

RALPH S. KENDALL, Primary Examiner

U.S. Cl. X.R.

117—132; 148—6.27; 260—29.2, 29.4, 29.6